(12) United States Patent
Kikuta et al.

(10) Patent No.: US 9,221,430 B2
(45) Date of Patent: Dec. 29, 2015

(54) WASHER APPARATUS FOR VEHICLE

(75) Inventors: Tomoyuki Kikuta, Toyohashi (JP);
Yukihiro Matsushita, Hamamatsu (JP)

(73) Assignee: ASMO CO., LTD., Shizuoka-pref. (JP)

( * ) Notice: Subject to any disclaimer, the term of this patent is extended or adjusted under 35 U.S.C. 154(b) by 987 days.

(21) Appl. No.: 13/399,326

(22) Filed: Feb. 17, 2012

(65) Prior Publication Data

US 2012/0266926 A1    Oct. 25, 2012

(30) Foreign Application Priority Data

Apr. 25, 2011 (JP) ................................. 2011-097446
Jul. 13, 2011 (JP) ................................. 2011-154991

(51) Int. Cl.
| | | |
|---|---|---|
| *B60S 1/58* | (2006.01) | |
| *B60S 1/48* | (2006.01) | |
| *B08B 3/02* | (2006.01) | |
| *B60S 1/08* | (2006.01) | |
| *B60S 1/62* | (2006.01) | |

(52) U.S. Cl.
CPC . *B60S 1/481* (2013.01); *B08B 3/02* (2013.01);
*B60S 1/0848* (2013.01); *B60S 1/486* (2013.01);
*B60S 1/58* (2013.01); *B60S 1/62* (2013.01)

(58) Field of Classification Search
CPC .......... B60S 1/481; B60S 1/482; B60S 1/486;
B60S 1/62; B60S 1/58; B60S 1/583; B60S
1/0848; B08B 3/02
USPC ............................. 134/57 R, 58 R; 239/284.1
See application file for complete search history.

(56) References Cited

U.S. PATENT DOCUMENTS

| | | | | |
|---|---|---|---|---|
| 4,999,550 | A | * | 3/1991 | Jones ............................... 318/50 |
| 2003/0090569 | A1 | * | 5/2003 | Poechmueller ............... 348/148 |
| 2009/0250533 | A1 | * | 10/2009 | Akiyama et al. ........... 239/284.1 |
| 2011/0073142 | A1 | * | 3/2011 | Hattori et al. ................ 134/56 R |

FOREIGN PATENT DOCUMENTS

| | | | | |
|---|---|---|---|---|
| DE | 102010005311 A1 | * | 9/2010 | .............. B60R 11/04 |
| DE | 102009031790 A1 | * | 1/2011 | |
| JP | A-11-255018 | | 9/1999 | |
| JP | A-2004-182080 | | 7/2004 | |
| JP | A-2009-220719 | | 10/2009 | |

OTHER PUBLICATIONS

Machine translation of DE102009031790A1, dated Jan. 2011.*

* cited by examiner

*Primary Examiner* — Joseph L Perrin
*Assistant Examiner* — Kevin G Lee
(74) *Attorney, Agent, or Firm* — Posz Law Group, PLC

(57) ABSTRACT

A branch conduit is branched from a main conduit. A switching device is provided at a location between an upstream side portion of the main conduit and the branch conduit and is adapted to connect the upstream side portion of the main conduit to one of a rear window wash nozzle and a camera wash nozzle. When the switching device receives an electric signal, which indicates placement of a vehicle in a reverse drive mode, the switching device connects the upstream side portion of the main conduit to the camera wash nozzle through the branch conduit upon disconnecting the upstream side portion of the main conduit from the at least one window wash nozzle.

17 Claims, 4 Drawing Sheets

WASHER APPARATUS FOR VEHICLE

CROSS REFERENCE TO RELATED APPLICATION

This application is based on and incorporates herein by reference Japanese Patent Application No. 2011-97446 filed on Apr. 25, 2011 and Japanese Patent Application No. 2011-154991 filed on Jul. 13, 2011.

TECHNICAL FIELD

The present disclosure relates to a washer apparatus for a vehicle.

BACKGROUND

At the time of driving the vehicle backward, it is known to capture an image of a rear side state of the vehicle through an onboard camera and to display the captured image on a monitor device of a vehicle navigation system. Since the onboard camera is placed at the outside of the vehicle, for instance, dirt will likely adhere to a lens of the onboard camera. When the dirt adheres to the lens of the onboard camera, it is difficult to capture and see a clear image of the rear side state of the vehicle through the onboard camera.

In order to address the above disadvantage, for instance, JPH11-255018A teaches an onboard camera washer apparatus that includes a nozzle and a pump. The nozzle sprays washer fluid over the lens of the onboard camera to wash the deposit adhered thereto, and the pump feeds the washer fluid to the nozzle. In this onboard camera washer apparatus, an electric motor is energized synchronously with a back alarm and a back lamp by supplying an electric current from an electric power source circuit of the back alarm or the back lamp to the electric motor at the time of driving the vehicle backward. In this way, the onboard camera is automatically washed at the time of driving the vehicle backward without requiring manipulation of a switch by a driver of the vehicle for executing the washing operation.

The above onboard camera washer apparatus includes the dedicated washer fluid tank and pump, which are dedicated for the washing of the onboard camera. It may be easy to have an accommodation space for accommodating, for example, the components of the above onboard camera washer apparatus in a case of large vehicles, such as a bus or truck. However, it is often difficult to have a sufficient accommodation space for the components of the above onboard camera washer apparatus in a case of a compact passenger vehicle.

Furthermore, the dedicated washer fluid tank and pump may result in an increase in the costs of the onboard camera washer apparatus.

SUMMARY

The present disclosure addresses the above disadvantages.

According to the present disclosure, there is provided a washer apparatus for a vehicle. The washer apparatus includes an onboard camera, a tank, a camera wash nozzle, at least one window wash nozzle, an electric pump, a washer switch, a main conduit, a branch conduit and a switching device. The onboard camera is placed at a rear side of the vehicle. The tank is adapted to store washer fluid. The camera wash nozzle is adapted to receive the washer fluid from the tank and to spray the washer fluid over one side of the onboard camera where a lens of the onboard camera is located. The at least one window wash nozzle is adapted to receive the washer fluid from the tank and to spray the washer fluid over at least one of a front window glass and a rear window glass of the vehicle. The electric pump is adapted to pump the washer fluid from the tank and thereby to supply the washer fluid toward the camera wash nozzle and the at least one window wash nozzle. The washer switch outputs a command to drive the electric pump when the washer switch is manipulatable by a user of the vehicle. The main conduit is adapted to connect between the electric pump and the at least one window wash nozzle to supply the washer fluid to the at least one window wash nozzle. The branch conduit is branched from the main conduit and is adapted to connect between an upstream side portion of the main conduit, which is located on an upstream side of the branch conduit, and the camera wash nozzle to supply the washer fluid to the camera wash nozzle. The switching device is provided at a location between the upstream side portion of the main conduit and the branch conduit and is adapted to connect the upstream side portion of the main conduit to one of the at least one window wash nozzle and the camera wash nozzle. When the switching device receives an electric signal, which indicates placement of the vehicle in a reverse drive mode, the switching device connects the upstream side portion of the main conduit to the camera wash nozzle through the branch conduit upon disconnecting the upstream side portion of the main conduit from the at least one window wash nozzle.

The washer apparatus may further includes a rear wiper motor and a controller. The rear wiper motor drives a rear wiper, which is adapted to wipe the rear window glass. The controller controls the switching device and the rear wiper motor. The controller controls the switching device to maintain the connection of the upstream side portion of the main conduit to the camera wash nozzle to spray the washer fluid through the camera wash nozzle upon driving of the electric pump through a predetermined time period when the controller receives both of the electric signal, which indicates the placement of the vehicle in the reverse drive mode, and the command outputted from the washer switch. The controller drives the rear wiper motor to wipe the rear window glass with the rear wiper in a subsequent period, which is immediately after the predetermined time period and in which the controller continuously receives the command from the washer switch even after elapsing of the predetermined time period.

BRIEF DESCRIPTION OF THE DRAWINGS

The drawings described herein are for illustration purposes only and are not intended to limit the scope of the present disclosure in any way.

DETAILED DESCRIPTION

A washer apparatus according to an embodiment of the present disclosure will be described with reference to FIGS. 1 and 2.

Figure 1:
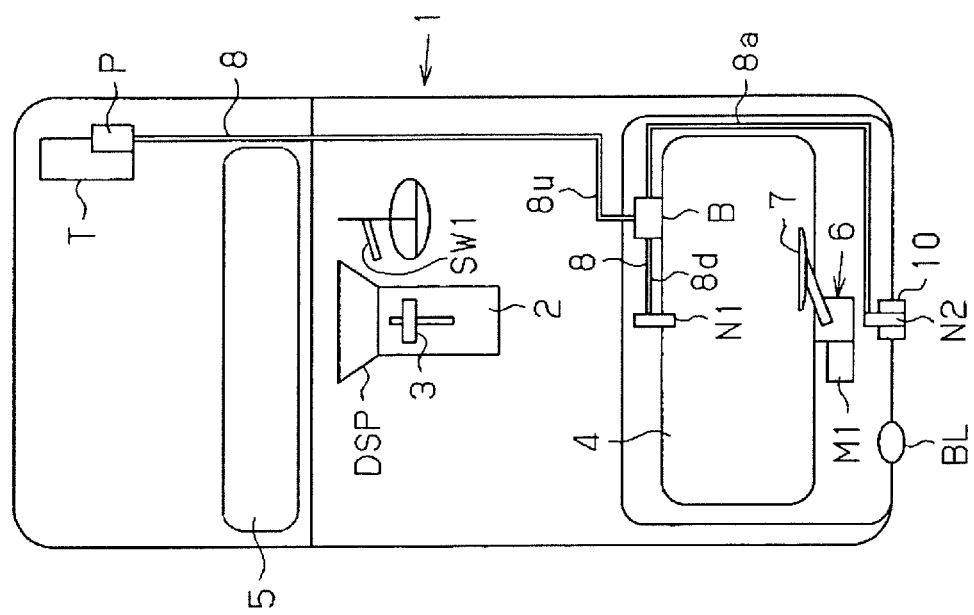
FIG. 1 is a schematic diagram of a vehicle having a washer apparatus according to an embodiment of the present disclosure.

As shown in FIG. 1, a shift lever 3 of a transmission 2 is placed on a lateral side of a driver's seat in a vehicle 1. When the shift lever 3 is manipulated by a driver (user) of the vehicle, a gear ratio of the transmission 2 is changed to change a speed of the vehicle 1. For instance, when the shift lever 3 is placed in a first speed position, the gear ratio of the transmission 2 is sifted to a first speed gear ratio. When the shift lever 3 is placed in a second speed position, the gear ratio of the transmission 2 is sifted to a second speed gear ratio. Furthermore, when the shift lever 3 is placed in a neutral position, the transmission 2 is sifted into a neutral state, disconnecting the transmission 2 from the driven road wheels.

When the shift lever 3 is placed in a reverse position, the vehicle 1 is enabled to move backward (placing the vehicle 1 into backwardly movable state, i.e., a reverse drive mode). At this time, a back lamp BL, which is provided at a rear side of the vehicle 1, is turned on, i.e., is lit as long as the shift lever 3 is placed in the reverse position.

A display device DSP is placed at a console panel of the vehicle 1 to display a current location of the vehicle 1 along with a map provided by a navigation system of the vehicle 1.

A rear wiper device 6 is placed in a rear center position of the vehicle 1 at a lower side of a rear window glass 4. In the rear wiper device 6, when a rear wiper motor M1 is driven to rotate, a wiping movement (swing movement) of a wiper blade (also referred to as a rear wiper) 7 along an external surface of the rear window glass 4 is executed to wipe the external surface of the rear window glass 4.

A rear window wash nozzle (also simply referred to as a window wash nozzle) N1 is placed in the rear center position of the vehicle 1 at an upper side of the rear window glass 4. A nozzle opening of the rear window wash nozzle N1 is directed to the rear window glass 4 located on a lower side of the nozzle opening of the rear window wash nozzle N1 to spray washer fluid over a wiping surface of the rear window glass 4 from the nozzle opening of the rear window wash nozzle N1.

The rear window wash nozzle N1 is connected to a washer pump P located in a front engine room of the vehicle 1 through a main conduit 8 (forming a flow passage of the washer fluid). The washer pump P is a pump that feeds the washer fluid from a tank T, which is placed in the engine room and stores the washer fluid, to the washer nozzle N1 through the main conduit 8. When a washer switch SW1, which is provided at the driver's seat side, is manipulated to an ON position by the driver, a pump motor M2 (see FIG. 2) of the washer pump P is driven to feed the washer fluid from the tank T to the rear window wash nozzle N1 through the main conduit 8.

A back monitor onboard camera 10 is placed at a rear outer side of the vehicle at a location, which is on a rear side of the rear wiper device 6. In the present embodiment, the onboard camera 10 is a rear view camera for monitoring a rear side (back side) of the vehicle 1. An image, which is captured by the onboard camera 10, is outputted to the display device DSP placed at the console panel of the vehicle 1. The display device DSP displays the image, which is captured by the onboard camera 10, on a screen of the display device DSP based on image data of the captured image.

When the shift lever 3 of the transmission 2 is placed into the reverse position to place the vehicle in the reverse drive mode, the onboard camera 10 begins to capture the image and outputs the image data of the captured image to the display device DSP. Then, when the shift lever 3 is shifted from the reverse position to another position, which is other than the reverse position, the onboard camera 10 terminates the capturing of the image.

A camera wash nozzle N2 is provided at a location, which is adjacent to the onboard camera 10 and is outside of a rear image capturing view angle of the onboard camera 10. A nozzle opening of the camera wash nozzle N2 is directed to one side of the onboard camera 10 where a lens 10b of the onboard camera 10 is located. More specifically, the nozzle opening of the camera wash nozzle N2 is directed to a glass cover 10a (see FIG. 2), which is also referred to as a transparent protective cover and is provided at the one side of the onboard camera 10 in front of the lens 10b to protect the lens 10b of the onboard camera 10 from, for example, dirt, debris and/or dust. The washer fluid is sprayed from the nozzle opening of the camera wash nozzle N2 over the glass cover 10a of the onboard camera 10. In the present embodiment, the glass cover 10a, which is made of glass, is used to protect the lens 10b. Alternatively, the cover 10a may be a transparent resin cover made of a transparent resin material.

The main conduit 8 connects between the washer pump P and the rear window wash nozzle N1, and the camera wash nozzle N2 is connected to a branch conduit 8a, which is branched from the main conduit 8. The branch conduit 8a is connected to the main conduit 8 at the branching portion thereof in the rear side of the vehicle 1, so that an upstream side portion 8u of the main conduit 8, which is located on an upstream side of the branch conduit 8a and extends from the washer pump P to the branching portion of the branch conduit 8a in the rear side of the vehicle 1, is commonly used to supply the washer fluid to the rear window wash nozzle N1 (i.e., a downstream side portion 8d of the main conduit 8, which is located on the downstream side of the branching portion and the upstream side portion 8u and is connected to the rear window wash nozzle N1) and the camera wash nozzle N2 (i.e., the branch conduit 8a). A solenoid switch valve (serving as a switching device) B is provided at a location between the upstream side portion 8u of the main conduit 8 and the branch conduit 8a. That is, the solenoid switch valve B is provided at the branching portion, at which the branch conduit 8a is branched from the main conduit 8, and at which the upstream side portion 8u of the main conduit 8 is connected to the downstream side portion 8d of the main conduit 8. The solenoid switch valve B is a valve that feeds the washer fluid received from the washer pump P to a corresponding one of the camera wash nozzle N2 and the rear window wash nozzle N1.

When the shift lever 3 is manipulated by the driver and is positioned into the reverse position, the solenoid switch valve B is driven to connect between the branch conduit 8a and the upstream side portion 8u of the main conduit 8. Specifically, the solenoid switch valve B disconnects between the rear window wash nozzle N1 and the washer pump P and connects between the camera wash nozzle N2 and the washer pump P. Thus, the camera wash nozzle N2 is placed into a feedable state, in which the washer fluid can be fed from the tank T to the camera wash nozzle N2 through the washer pump P.

In this feedable state, when the washer switch SW1, which is provided at the driver's seat side, is manipulated to the ON position by the driver, the washer pump P is driven to feed the washer fluid from the tank T to the camera washer nozzle N2 through the upstream side portion 8u of the main conduit 8 and the branch conduit 8a. Thus, the washer fluid is sprayed from the nozzle opening of the camera wash nozzle N2 over the glass cover 10a of the onboard camera 10.

In contrast, when the shift lever 3 of the transmission 2 is positioned into the other position, which is other than the reverse position, the solenoid valve B is placed into a non-operating state. In the non-operating state of the solenoid switch valve B, the connection between the branch conduit 8a and the upstream side portion 8u of the main conduit 8 is disconnected. That is, the solenoid switch valve B connects between the rear window wash nozzle N1 and the washer pump P through the upstream side portion 8u and the downstream side portion 8d of the main conduit 8. Thus, normally (i.e., in the state where the shift lever 3 is placed into the other position that is other than the reverse position of the shift lever 3), the rear window wash nozzle N1 is placed into a feedable state, in which the washer fluid can be fed from the tank T to the rear window wash nozzle N1 through the washer pump P.

In this feedable state, when the washer switch SW1, which is provided at the driver's seat side, is manipulated to the ON position by the driver, the washer pump P is driven to feed the washer fluid from the tank T to the rear window wash nozzle N1 through the upstream side portion 8u and the downstream side portion 8d of the main conduit 8. Thus, the washer fluid is sprayed from the nozzle opening of the rear window wash nozzle N1 over the rear window glass 4.

Next, an electrical structure of the washer apparatus, which is constructed in the above described manner, will be described with reference to FIG. 2.

Figure 2:
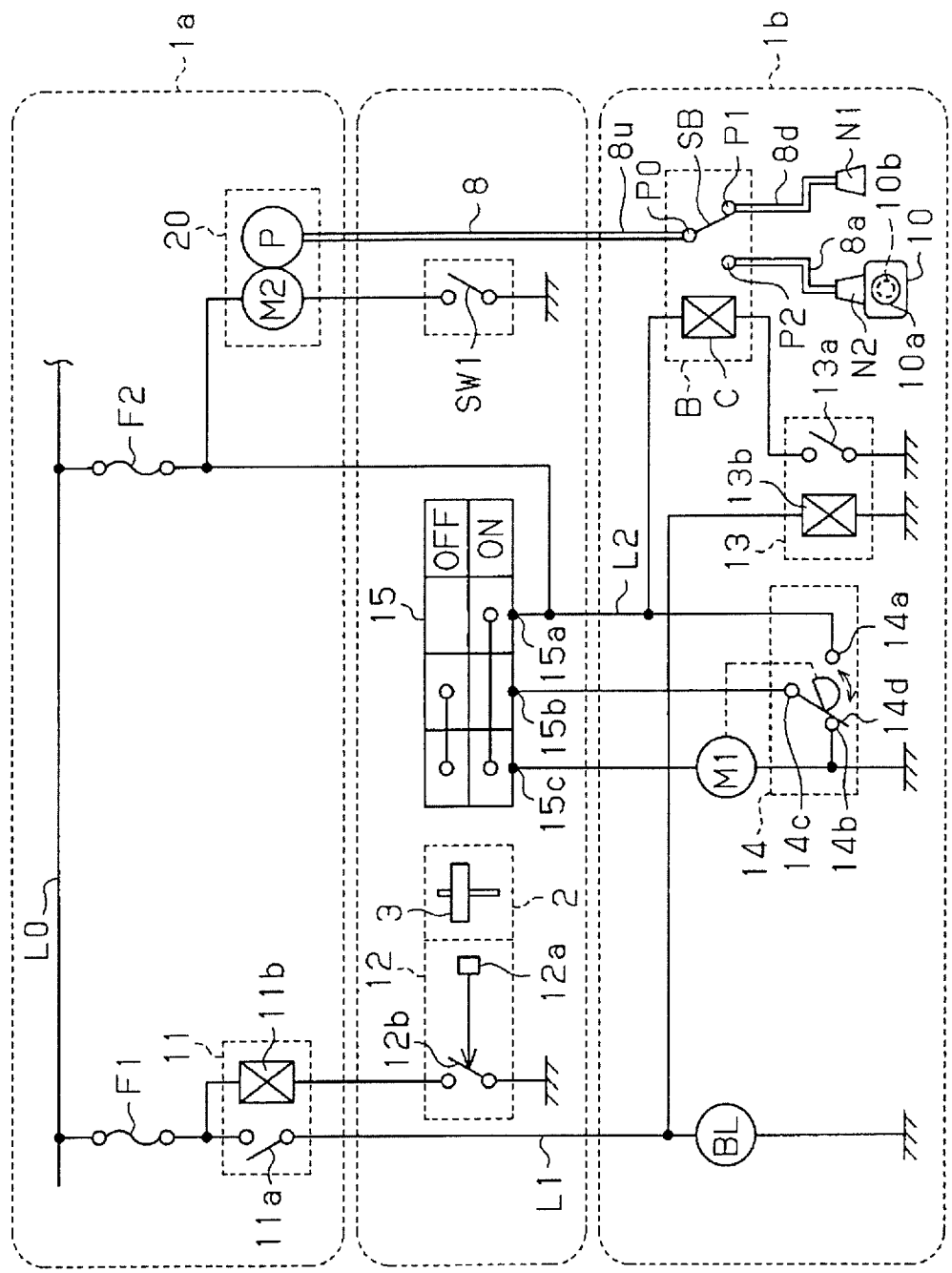
FIG. 2 is a circuit diagram showing an electrical structure of the washer apparatus according to the present embodiment.

In FIG. 2, one end of the back lamp BL, which is provided at the rear side 1b of the vehicle 1, is grounded, and the other end of the back lamp BL is connected in series to a back lamp relay 11, which is provided in the engine room at the front side 1a of the vehicle 1, through a lamp harness L1.

The back lamp relay 11 is a reed relay, which includes a reed switch 11a and a magnetizing coil (also referred to as an exciting coil) 11b. A plus (+) terminal of the reed switch 11a is connected to a plus (+) power supply line L0 through a fuse F1, and a minus (−) terminal of the reed switch 11a is connected to the back lamp BL through the lamp harness L1. When the magnetizing coil 11b is magnetized upon energization thereof, the reed switch 11a is turned on to supply the electric current to the back lamp BL, and thereby the back lamp BL is turned on, i.e., is lit.

One end of the magnetizing coil 11b of the back lamp relay 11 is connected to the plus terminal of the reed switch 11a, and the other end of the magnetizing coil 11b is connected to a position sensor 12.

The position sensor 12 is a sensor that senses the reverse position of the shift lever 3 of the transmission 2. The position sensor 12 includes a sensing device 12a and an open/close switch 12b. The sensing device 12a is a sensing element placed at a location that is adjacent to the reverse position of the shift lever 3. The open/close switch 12b is a switching transistor, which is turned on or off in response to a detection signal received from the sensing device 12a.

When the shift lever 3 is positioned in the reverse position, the sensing device 12a outputs the detection signal, which turns on the open/close switch 12b (thereby resulting in a closed circuit connection of the open/close switch 12b). In contrast, when the shift lever 3 is positioned in the other position, which is other than the reverse position, the sensing device 12a stops the outputting of the detection signal, and thereby the open/close switch 12b is turned off (thereby resulting in an opened circuit connection of the open/close switch 12b).

One end of the open/close switch 12b is connected to the magnetizing coil 11b of the back lamp relay 11, and the other end of the open/close switch 12b is grounded. When the sensing device 12a senses the placement of the shift lever 3 into the reverse position, the open/close switch 12b is turned on to supply the electric current to the magnetizing coil 11b. That is, the back lamp BL is lit when the electric current is supplied to the back lamp BL through the lamp harness L1 upon turning on of the reed switch 11a.

In contrast, when the sensing device 12a senses the placement of the shift lever 3 into the other position, which is other than the reverse position, the open/close switch 12b is turned off to stop the supply of the electric current to the magnetizing coil 11b. That is, the back lamp BL is not lit when the electric current is not supplied to the back lamp BL through the lamp harness L1 upon turning off of the reed switch 11a.

A camera wash relay 13 is connected to a connection between the back lamp BL and the lamp harness L1 at the rear side 1b of the vehicle 1. The camera wash relay 13 is a reed relay, which includes a reed switch 13a and a magnetizing coil 13b.

The magnetizing coil 13b is energized simultaneously with the turning on of the back lamp BL to turn on the reed switch 13a. The magnetizing coil 13b is deenergized simultaneously with the turning off of the back lamp BL to turn off the reed switch 13a. Specifically, the camera wash relay 13 is adapted to receive a portion of the electric current (electric power), which is outputted to, i.e., is directed to the back lamp BL to energize (to turn on) the back lamp BL. When this electric current is supplied to the camera wash relay 13, the magnetizing coil 13b is energized, and thereby resulting in the turning on of the reed switch 13a. When this electric current is not supplied to the camera wash relay 13, the magnetizing coil 13b is not energized, and thereby resulting in the turning off of the reed switch 13a. The above-described portion of the electric current (electric power) supplied to the camera wash relay 13 serves as an electric signal, which is supplied to the solenoid switch valve B and indicates that the vehicle is in the reverse drive mode.

When the reed switch 13a is turned on, a magnetizing coil C of the solenoid switch valve B described later in detail is energized.

One end of a rear wiper motor M1, which drives the rear wiper device 6, is connected to a rear wiper switch 15. A first terminal (also referred to as a +B terminal) 15a of the rear wiper switch 15 is connected to the plus power supply line L0 through a fuse F2, which is placed in the engine room at the front side 1a of the vehicle 1. The other end of the rear wiper motor M1 is grounded.

A cam-operated switch 14 is installed to the rear wiper motor M1. The cam-operated switch 14 forms an automatic stop position control device of the rear wiper device 6, which drives the rear wiper motor M1 to move the wiper blade 7 all the way back to a home position thereof even when the wiper blade 7 is located in a location, which is other than the home position, upon turning off of the rear wiper switch 15.

The cam-operated switch 14 includes a first contact (also referred to as an a contact) 14a, a second contact (also referred to as a b contact) 14b, a common contact 14c and a movable contact 14d. The first contact 14a is connected to the plus power supply line L0 through the fuse F2. The second contact 14b is connected to the other end of the wiper motor M1 and is grounded along with the other end of the wiper motor M1. One end of the movable contact 14d is connected to the common contact 14c, which is connected to a second terminal (also referred to as an S-terminal) 15b of the rear wiper switch 15. The movable contact 14d is moved in response to the rotation of the rear wiper motor M1. The movable contact 14d is movable, so that the other end of the movable contact 14d is connectable to one of the first contact 14a and the second contact 14b.

Specifically, when the wiper blade 7 is in the other position, which is other than the home position, the movable contact 14d is connected to the first contact 14a. Therefore, even when the rear wiper switch 15 is held in the OFF position, the supply of the electric power from the plus power source line L0 to the rear wiper motor M1 is maintained through the cam-operated switch 14.

Then, when the wiper blade 7 is placed in the home position, the movable contact 14*d* is moved away from the first contact 14*a* and is then connected to the second contact 14*b*. In this way, the one end and the other end of the rear wiper motor M1 form a closed circuit and are both grounded, so that a dynamic braking is applied to stop the rotation of the wiper motor M1.

The rear wiper switch 15 is a switch that is provided to drive the rear wiper motor M1. The rear wiper switch 15 is turned on or off by the driver. The rear wiper switch 15 includes the first terminal (+B terminal) 15*a*, the second terminal (S terminal) 15*b* and a third terminal (also referred to as a +1 terminal) 15*c*.

The third terminal (+1 terminal) 15*c* is connected to the one end (positive terminal side) of the rear wiper motor M1. The Second terminal (S terminal) 15*b* is connected to the common contact 14*c* of the cam-operated switch 14. The first terminal (+B terminal) 15*a* is connected to the plus power supply line L0 through the fuse F2 and is also connected to the first contact (a contact) 14*a* of the cam-operated switch 14.

At the time of driving the rear wiper motor M1 (at the time of driving the rear wiper device 6), the rear wiper switch 15 is manipulated by the driver from the OFF position to the ON position. That is, the electric current is supplied from the power source line L0 through the first terminal (+B terminal) 15*a* of the rear wiper switch 15, the third terminal (+1 terminal) 15*c* of the rear wiper switch 15 and the rear wiper motor M1 in this order regardless of the state of the cam-operated switch 14, so that the rear wiper motor M1 is driven to rotate.

At the time of stopping the rear wiper motor M1 (at the time of stopping the rear wiper device 6), the rear wiper switch 15 is manipulated by the driver from the ON position to the OFF position. Then, the supply of the electric current to the rear wiper motor M1 is controlled by the cam-operated switch 14. That is, as discussed above, when the wiper blade 7 is placed in the other position, which is other than the home position, the supply of the electric current from the plus power supply line L0 is maintained through the cam-operated switch 14 to drive the rear wiper motor M1. Then, when the wiper blade 7 is placed in the home position, the supply of the electric current from the plus power supply line L0 is stopped through the cam-operated switch 14 to stop the rear wiper motor M1.

One end of the pump motor M2, which drives the washer pump P, is connected to the power supply line L0 through the fuse F2, and the other end of the pump motor M2 is connected to the washer switch SW1. When the washer switch SW1 is placed in the ON position, the electric current is supplied from the power supply line L0 to the pump motor M2, and thereby the pump motor M2 drives the washer pump P. In this way, the washer pump P is driven to feed the washer fluid from the tank T to the main conduit 8 (more specifically, the upstream side portion 8*u* of the main conduit 8).

That is, the pump motor M2 and the washer pump P form an electric pump 20. When the washer switch SW1 is manipulated to the ON position, the electric pump 20 is driven to feed the washer fluid from the tank T to the main conduit 8 (more specifically, the upstream side portion 8*u* of the main conduit 8).

The solenoid switch valve B includes an intake port P0, through which the washer fluid is supplied from the upstream side portion 8*u* of the main conduit 8 located on the upstream side of solenoid switch valve B. The solenoid switch valve B further includes a first discharge port P1 and the second discharge port P2. The first discharge port P1 is adapted to discharge the washer fluid to a downstream side portion 8*d* of the main conduit 8, which is located on the downstream side of the solenoid switch valve B and is connected to the rear window wash nozzle N1. The second discharge port P2 is adapted to discharge the washer fluid to the branch conduit 8*a*, which is located on the downstream side of the solenoid switch valve B and is connected to the camera wash nozzle N2.

When a spool valve SB, which is provided in a valve main body in the solenoid switch valve B, is driven, the intake port P is connected to one of the first discharge portion P1 and the second discharge port P2 while disconnecting the intake port P from the other one of the first discharge portion P1 and the second discharge port P2.

The spool valve SB is controlled by the magnetizing coil C, which is provided in the solenoid switch valve B.

When the magnetizing coil C is not energized, the spool valve SB connects between the intake port P0 and the first discharge port P1 and disconnects between the intake port P0 and the second discharge port P2. When the magnetizing coil C is energized, the spool valve SB is driven and connects between the intake port P0 and the second discharge port P2 and disconnects between the intake port P0 and the first discharge port P1.

One end of the magnetizing coil C of the solenoid switch valve B is connected to the connection of the motor harness (serving as a portion of a power supply circuit that supplies the electric power to the rear wiper motor M1) L2, which is connected to the cam-operated switch 14 of the rear wiper motor M1 at the rear side 1*b* of the vehicle 1. The other end of the magnetizing coil C of the solenoid switch valve B is connected to the reed switch 13*a* of the camera wash relay 13. Therefore, when the back lamp BL is turned on, i.e., is lit upon the positioning of the shift lever 3 into the reverse position, the reed switch 13*a* is turned on, and thereby the electric current is supplied to the magnetizing coil C to energize the same.

Thereby, when the magnetizing coil C of the solenoid switch valve B is energized, the spool valve SB is driven and connects between the intake port P0 and the second discharge port P2. That is, a portion of the electric power directed to the rear wiper motor M1 is supplied to the magnetizing coil C of the solenoid switch valve B to energize the same.

Next, an operation of the washer apparatus, which is constructed in the above described manner, will be described.

Now, for the descriptive purpose, it is assumed that as shown in FIG. 2, the shift lever 3 is positioned in the other position, which is other than the reverse position, and each of the washer switch SW1 and the rear wiper switch 15 is held in the OFF position.

At this time, the shift lever 3 is placed in the other position, which is other than the reverse position. Therefore, the reed switch 11*a* of the back lamp relay 11 is turned off, and the back lamp BL is not turned on, i.e., is not lit. Furthermore, the magnetizing coil 13*b* of the camera washer relay 13 is not energized. Furthermore, since the washer switch SW1 is turned off, the pump motor M2 is not driven. Therefore, the washer fluid is not fed from the washer pump P to the main conduit 8. Furthermore, since the rear wiper switch 15 is positioned in the OFF position, the rear wiper motor M1 is not driven. Therefore, the rear wiper device 6 is not operated.

In the above state (hereinafter, this state will be referred to as an initial state), when the rear wiper switch 15 is manipulated and is thereby changed from the OFF position to the ON position, the electric current is supplied to the rear wiper motor M1 through the rear wiper switch 15 regardless the state of the cam-operated switch 14. When the rear wiper motor M1 is rotated, the rear wiper device 6 is driven to swing the wiper blade 7 along the rear window glass 4 and thereby to wipe the rear window glass 4.

During the wiping movement of the wiper blade 7, when the washer switch SW1 is turned on, the pump motor M2 is rotated. When the pump motor M2 is rotated, the washer pump P is driven to feed the washer fluid of the tank T to the main conduit 8 (more specifically, the upstream side portion 8u of the main conduit 8).

At this time, the reed switch 13a of the camera wash relay 13 is turned off, and the magnetizing coil C of the solenoid switch valve B is not energized. Therefore, the intake port P0 and the first discharge port P1 are connected with each other in the solenoid switch valve B. Therefore, the washer fluid is fed to the rear window wash nozzle N1 through the upstream side portion 8u and the downstream side portion 8d of the main conduit 8 and is sprayed over the rear window glass 4 through the nozzle opening of the rear window washer nozzle N1.

At this time, the intake port P0 and the second discharge port P2 are disconnected from each other in the solenoid switch valve B. Therefore, the washer fluid is not supplied to the camera wash nozzle N2.

Thereafter, when the washer switch SW1 is manipulated by the driver and is thereby turned off, the rotation of the pump motor M2 is stopped. As a result, the feeding of the washer fluid to the rear window wash nozzle N1 is stopped. At this time, only the rear wiper device 6 is operated.

In the above case, the washer switch SW1 is manipulated and is thereby turned on after the start of the wiping operation of the rear wiper device 6 (after the manipulation of the rear wiper switch 15), so that the washer fluid is sprayed from the rear window wash nozzle N1 during the wiping movement of the wiper blade 7.

This operational sequence may be modified as follows. That is, the washer fluid may be sprayed from the rear window wash nozzle N1 over the rear window glass 4 by turning on of the washer switch SW1, and thereafter the rear wiper switch 15 may be manipulated to execute the wiping movement of the wiper blade 7 over the rear window glass 4 to wipe the same.

In the initial state, when the shift lever 3 is positioned into the reverse position, the position sensor 12 senses this positioning of the shift lever 3 into the reverse position. Thereby, the magnetizing coil 11b of the back lamp relay 11 is energized to turn on the reed switch 11a. In this way, the electric current flows from the lamp harness L1 to the back lamp BL, so that the back lamp BL is lit. At this time, a portion of the electric current supplied from the lamp harness L1 is supplied to the magnetizing coil 13b of the camera wash relay 13, so that the reed switch 13a of the camera wash relay 13 is held in the ON state.

When the reed switch 13a of the camera wash relay 13 is turned on, the electric current, which is supplied from the motor harness L2, is supplied to the magnetizing coil C of the solenoid switch valve B to energize the same. Therefore, at the solenoid switch valve B, the connection between the intake port P0 and the first discharge port P1 through the spool valve SB is switched to the connection between the intake port P0 and the second discharge port P2 through the spool valve SB.

In this state, when the washer switch SW1 is turned on, the pump motor M2 is rotated. When the pump motor M2 is rotated, the washer pump P is driven to feed the washer fluid of the tank T to the main conduit 8 (more specifically, the upstream side portion 8u of the main conduit 8). In the energized state of the magnetizing coil C of the solenoid switch valve B, the intake port P0 and the second discharge port P2 are connected with each other at the solenoid switch valve B. Therefore, the washer fluid is fed to the camera wash nozzle N2 through the branch conduit 8a and is sprayed from the nozzle opening of the camera wash nozzle N2 over the glass cover 10a of the onboard camera 10. In this way, the deposit (e.g., the dirt, debris and/or dust) adhered on the glass cover 10a of the onboard camera 10 is washed away.

At this time, the intake port P0 and the first discharge port P1 are disconnected from each other in the solenoid switch valve B. Therefore, the washer fluid is not supplied to the rear window wash nozzle N1 through the downstream side portion 8d of the main conduit 8.

Thereafter, when the washer switch SW1 is manipulated and is thereby turned off, the rotation of the pump motor M2 is stopped. As a result, the feeding of the washer fluid to the camera wash nozzle N2 is stopped.

Next, advantages of the present embodiment will be described.

(1) According to the present embodiment, the preexisting tank T and the preexisting electric pump 20 (the pump motor M2 and the washer pump P), which are initially provided to wash the rear window glass 4, are also used to wash the onboard camera 10.

Therefore, it is not required to provide a dedicated washer fluid tank and a dedicated electric pump, which are solely dedicated for the purpose of washing the onboard camera 10, in the washer apparatus. As a result, the required accommodation space, which is taken by the washer apparatus, can be made small, and thereby a degree of freedom in the designing of the washer apparatus in terms its location can be improved.

Furthermore, since it is not required to provide the dedicated washer tank and the dedicated electric pump, which are solely dedicated for the purpose of washing the onboard camera 10, it is possible to manufacture the washer apparatus at the low costs.

(2) According to the present embodiment, the solenoid switch valve B is provided to the main conduit 8, which connects between the washer pump P and the rear window wash nozzle N1 (more specifically, the solenoid switch valve B being provided at the connecting portion between the upstream side portion 8u and the downstream side portion 8d of the main conduit 8). Furthermore, the branch conduit 8a, which is branched from the main conduit 8, is provided. The camera wash nozzle N2 is connected to the branch conduit 8a.

When the shift lever 3 is shifted to the reverse position, the washer pump P and the camera wash nozzle N2 are connected with each other. In contrast, when the shift lever 3 is shifted to the other position, which is other than the reverse position, the washer pump P and the rear window wash nozzle N1 are connected with each other.

Therefore, the onboard camera 10 can be washed simply by shifting the shift lever 3 to the reverse position and manipulating the washer switch SW1 to the ON position. Furthermore, at the time of washing the onboard camera 10, the washer fluid is not fed to the rear window wash nozzle N1. Therefore, the washer fluid is not wasted.

(3) According to the present embodiment, the main conduit 8 is a relatively long conduit, which connects the tank T, the pump motor M2 and the washer pump P placed in the engine room at the front side 1a of the vehicle 1 to the rear window wash nozzle N1 placed at the rear side 1b of the vehicle 1. The branch conduit 8a is connected to the middle (the rear side 1b of the vehicle 1) of the main conduit 8, and the camera wash nozzle N2 is connected to the branch conduit 8a. Therefore, it is not required to separately provide a dedicated long conduit, which connects the tank T, the pump motor M2 and the washer pump P to the camera wash nozzle N2. Therefore, the conduit structure of the washer apparatus is simplified.

(4) According to the present embodiment, when the shift lever 3 is shifted to the reverse position, the position sensor 12 senses this shifting of the shift lever 3 to the reverse position, and thereby the back lamp relay 11 and the camera wash relay 13 are turned on. In this way, the magnetizing coil C of the solenoid switch valve B is energized to enable the feeding of the washer fluid to the camera wash nozzle N2, so that the wash standby state of the onboard camera 10 is implemented.

In this standby state, when the driver of the vehicle manipulates the washer switch SW1 to turn on the same on his/her will, the washer fluid is immediately sprayed from the camera wash nozzle N2.

Therefore, the onboard camera 10, which is used to check the rear state of the vehicle 1, can be quickly washer.

(5) According to the present embodiment, at the camera wash relay 13, through which the electric current is supplied to the magnetizing coil C of the solenoid switch valve B, the magnetizing coil 13b is energized to turn on the reed switch 13a by using the portion of the electric current (electric power) directed to the back lamp BL.

Therefore, when the portion of the electric current directed to the back lamp BL is supplied through the lamp harness L1 at the rear side of the vehicle 1 and is used as the drive signal (electric signal) of the camera wash relay 13, a total length of the signal line(s) from the shift lever 3 to the rear side 1b of the vehicle 1 can be substantially shortened in comparison to a case where two separate dedicated lines are provided in parallel to supply the electric current to the back lamp BL and the camera wash relay 13, respectively.

(6) According to the present embodiment, at the rear side 1b of the vehicle 1, the magnetizing coil C of the solenoid switch valve B is connected to the motor harness L2, which supplies the electric current to the rear wiper motor M1. Then, the portion of the electric current directed to the rear wiper motor M1 is used to energize the energizing coil C.

Therefore, it is possible to substantially reduce a total length of the power supply line(s), which extends from the electric power source (e.g., the battery) placed in the engine room at the front side of the vehicle 1 to the solenoid switch valve B placed at the rear side 1b of the vehicle 1 in comparison to a case where two separate power supply lines are provided in parallel to supply the electric current to the rear wiper motor M1 and the magnetizing coil C of the solenoid switch valve B, respectively. Furthermore, the power supply line is heavier than the signal line. Therefore, according to the present embodiment, it is possible to reduce the weight.

The above embodiment may be modified as follows.

In the above embodiment, the washer apparatus uses the tank T, the pump motor M2 and the washer pump P, which are initially provided to supply the washer fluid to the rear window glass 4. Alternatively, the washer apparatus of the above embodiment may use a tank, a pump motor and a washer pump, which are initially provided to supply washer fluid to a front window glass (windshield) 5 of the vehicle. Furthermore, in terms of space saving, it is advantageous to commonly use a single tank for the front side (front window glass washing) and the rear side (rear window glass washing) of the vehicle.

In the above embodiment, the portion of the electric current directed to the back lamp BL is supplied to the camera wash relay 13 upon the turning on of the back lamp BL, which is turned on by the shifting of the shift lever 3 into the reverse position. Alternatively, in a case where a warning buzzer (a warning sound generator), which notifies the backward movement of the vehicle, is provided in the vehicle, when the shift lever 3 is shifted to the reverse position, the warning buzzer may be turned on, and at the same time, a portion of the electric current directed to the warning buzzer may be supplied to the camera wash relay 13 to energize the magnetizing coil 13b.

Here it should be understood that a separate dedicated current, which is different from the electric current supplied to the back lamp BL, may be supplied to the camera wash relay 13 upon shifting of the shift lever 3 to the reverse position. In such a case, for example, it is required to connect a new reed relay to the back lamp relay 11 in parallel.

Furthermore, the magnetizing coil C of the solenoid switch valve B may be connected to the lamp harness L1, which is connected to the back lamp BL, so that the magnetizing coil C may be directly energized with the electric current directed to the back lamp BL. In this way, the magnetizing coil C of the solenoid switch valve B can be used as the camera wash relay 13, and thereby the camera wash relay 13 of the above embodiment may be eliminated.

The washer apparatus of the above embodiment may be modified such that the electric pump 20 and the rear wiper motor M1 are driven based on a command signal (or simply referred to as a command) outputted from the washer switch S1 (the washer fluid being sprayed over the rear window glass 4, and the rear window glass 4 being washed by the wiper blade (the rear wiper) 7).

Figure 3:
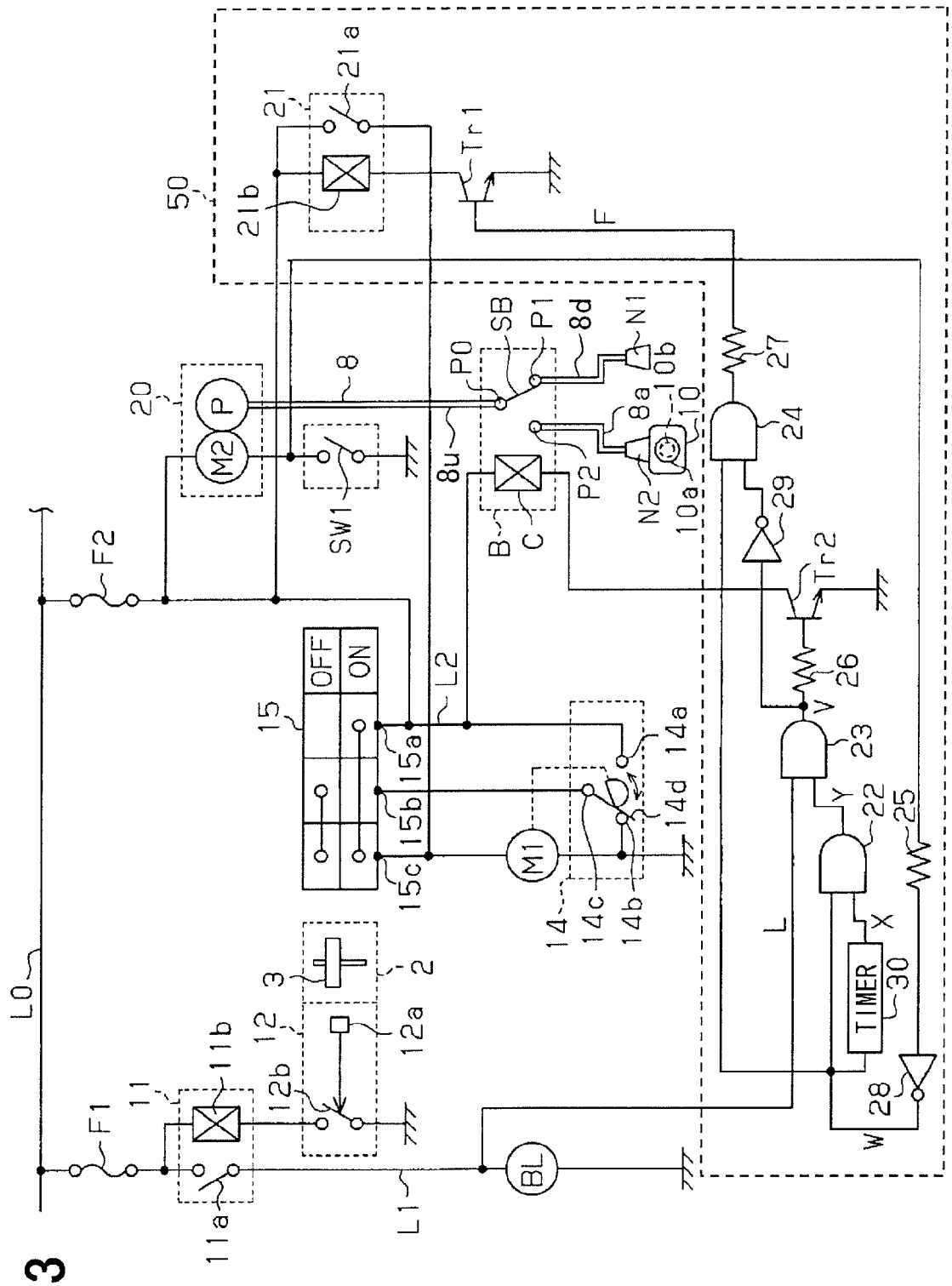
FIG. 3 is a circuit diagram showing an electrical structure of a washer apparatus for a vehicle in a modification of the embodiment.

For example, the washer apparatus of the above embodiment may be modified in a manner shown in FIG. 3. In this modification shown in FIG. 3, the camera wash relay 13 of the above embodiment is eliminated, and a wiper drive relay 21, NPN transistors Tr1, Tr2, AND circuits 22-24, resistors 25-27, inverter circuits 28, 29 and a timer (serving as timer means) 30, which form a controller (control circuit) 50, are newly added. In this example, the transistor Tr1, the AND circuits 22-24 and the inverter circuit 29 may cooperate together to serve as wiper control means or a wiper control circuit.

The wiper drive relay 21 includes a switch 21a and a magnetizing coil 21b. One end of the switch 21a is connected to the plus power supply line L0 through the fuse F2, and the other end of the switch 21a is connected to the one end (the positive terminal side) of the rear wiper motor M1. One end of the magnetizing coil 21b is connected to the plus power supply line L0 through the fuse F2, and the other end of the magnetizing coil 21b is grounded through the transistor Tr1. Specifically, the wiper drive relay 21 is constructed such that when the transistor Tr1 is turned on, the magnetizing coil 21b is energized to turn on the switch 21a. When the switch 21a is turned on, the electric current is supplied to the rear wiper motor M1 regardless of the operational state of the rear wiper switch 15.

The AND circuit 22 receives a washer switch signal W (the command signal of the washer switch) from the inverter circuit 28, which is connected to the washer switch SW1 through the resistor 25, and the AND circuit 22 also receives this washer switch signal W through the timer 30. When the timer 30 receives the washer switch signal W having the H-level (high level), the timer 30 outputs a signal X having the H-level through a predetermined time period (e.g., two seconds). That is, when the washer switch SW1 is manipulated and is thereby turned on, the AND circuit 22 outputs a signal (timer signal) Y having the H-level through a predetermined time period t.

Furthermore, when the signal (timer signal) Y, which is outputted from the AND circuit 22, and the signal (back lamp signal indicating the reverse state) L, which is outputted from the lamp harness L1, are supplied to the AND circuit 23, the AND circuit 23 outputs a camera wash switch signal V having the H-level in a state where the received signals Y, L both have the H-level. In contrast, when at least one of the signals Y, L has the L-level (low level), the AND circuit 23 outputs the camera wash switch signal V having the L-level.

Here, the other end of the magnetizing coil C of the solenoid switch valve B is grounded through the transistor Tr2. An output terminal of the AND circuit 23 is connected to a base terminal of the transistor Tr2 through the resistor 26. Therefore, in the state where the shift lever 3 is in the reverse position, the transistor Tr2 is turned on from the time of turning on of the washer switch SW1 until the time of elapsing the predetermined time period t. During the period of turning on of the transistor Tr2, the magnetizing coil C is energized, and the spool valve SB connects between the intake port P0 (the upstream side portion 8u of the main conduit 8) and the second discharge port P2 (the branch conduit 8a). When the transistor Tr2 is turned off (e.g., upon the elapse of the predetermined time period t), the magnetizing coil C is deenergized, and thereby the spool valve SB connects between the intake port P0 and the first discharge port P1 (i.e., connects between the upstream side portion 8u and the downstream side portion 8d of the main conduit 8).

The AND circuit 24 receives the washer switch signal W, and the AND circuit 24 also receives the camera wash switch signal V, which is outputted from the AND circuit 23, through the inverter circuit 29 (i.e., an inverted signal, which is generated by inverting the camera switch signal V through the inverter circuit 29). An output terminal of the AND circuit 24 is connected to a base terminal of the transistor Tr1 to output a wiper drive signal F to the transistor Tr1. Thereby, after elapsing of the predetermined time period t, the transistor Tr1 is turned on throughout an ON period, during which the washer switch SW1 is kept turned on (upon receiving the wiper drive signal F having the H-level). The electric current is supplied to the rear wiper motor M1 throughout the ON period.

Figure 4:
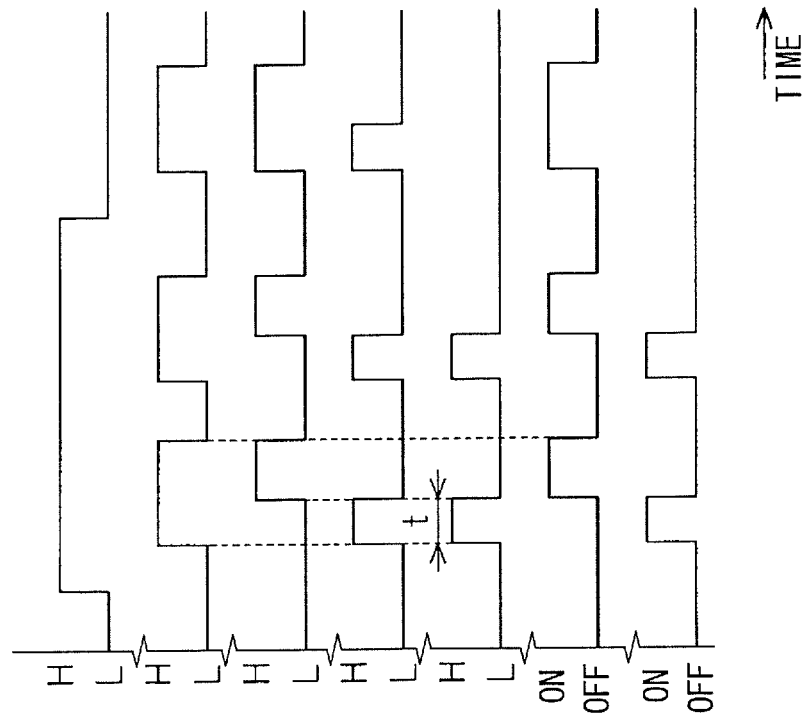
FIG. 4 is a diagram showing a timing chart for various signals and operations in the washer apparatus in the modification of the embodiment.
Figure 4:
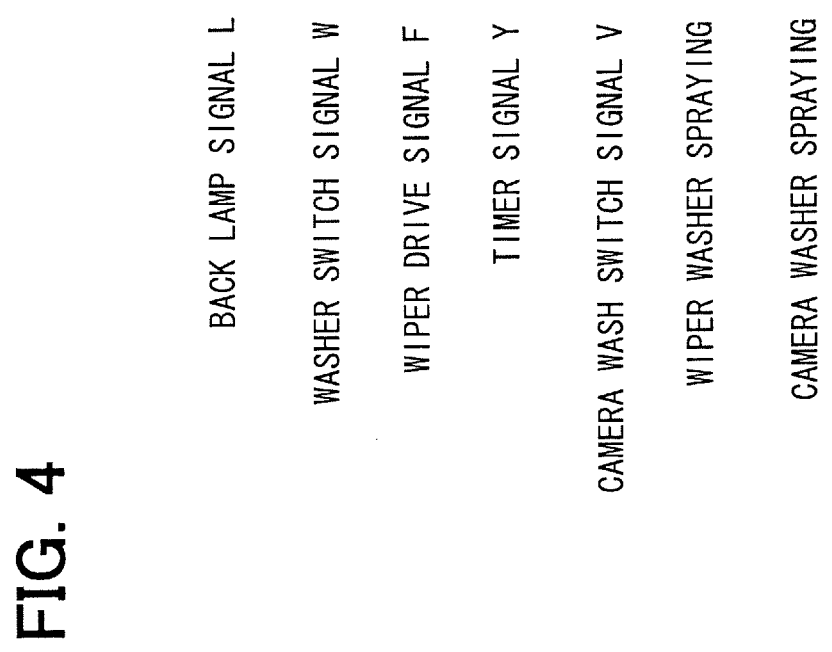

In the vehicular washer apparatus, which is constructed in the above described manner, as shown in FIG. 4, when the washer switch signal W becomes the H-level in the state where the back lamp signal L is the H-level (the state where the shift lever 3 is positioned in the reverse position), the timer signal Y and the camera wash switch signal V are held in the H-level through the predetermined time period t. In this way, throughout the predetermined time period t, the intake port P0 (the upstream side portion 8u of the main conduit 8) and the second discharge port P2 (the branch conduit 8a) are connected with each other, and the washer fluid is sprayed from the camera wash nozzle N2 over the glass cover 10a, so that the deposit (e.g., the dirt, debris and/or dust) adhered on the glass cover 10a of the onboard camera 10 is washed away. The time period of spraying the washer fluid from the camera wash nozzle N2 (see "camera washer spraying" in FIG. 4) may possibly be slightly delayed from the one shown in FIG. 4 (the predetermined time period t) due to the operation time lag of the mechanism. However, for the sake of simplicity, such a delay is ignored in FIG. 4.

In the state where the washer switch signal W is the H-level, when the timer signal Y becomes the L-level after the elapse of the predetermined time period t, the camera wash switch signal V becomes the L-level, and the wiper drive signal F becomes the H-level (during the period of the H-level of the washer switch signal W). In this way, in the ON period of the washer switch SW1, during which the washer switch SW1 is kept in the ON position, after the elapse of the predetermined time period t, the intake port P0 and the first discharge port P1 are connected with each other in the subsequent period, which is immediately after the elapsing of the predetermined time period t, and thereby the washer fluid is sprayed from the rear window wash nozzle N1 over the rear window glass 4, and the rear wiper motor M1 is driven to wipe the rear window glass 4 with the wiper blade (the rear wiper) 7. The time period of spraying the washer fluid from the rear window wash nozzle N1 (see "wiper washer spraying" in FIG. 4) may possibly be slightly delayed from the one shown in FIG. 4 due to the operation time lag of the mechanism. However, for the sake of simplicity, such a delay is ignored in FIG. 4. Furthermore, even in the state where the wiper drive signal F becomes the L-level, as long as the wiper blade (the rear wiper) 7 is out of the home position, the supply of the electric current to the rear wiper motor M1 is maintained through the cam-operated switch 14. When the wiper blade 7 is placed in the home position, the supply of the electric current to the rear wiper motor M1 is turned off, so that the rear wiper motor M1 is stopped at the time of placing the wiper blade 7 in the home position.

Furthermore, in the state where the back lamp signal L is the L-level (the state where the shift lever 3 is placed in the other position, which is other than the reverse position), when the washer switch signal W becomes the H-level (when the washer switch SW1 is turned on), the camera wash switch signal V becomes the L-level regardless of the timer signal Y. Therefore, the wiper drive signal F becomes the H-level (during the period, in which the washer switch signal W is kept in the H-level). In this way, throughout the ON period of the washer switch SW1, during which the washer switch SW1 is kept in the ON position, the intake port P0 and the first discharge port P1 are connected with each other, and the washer fluid is sprayed from the rear window wash nozzle N1 over the rear window glass 4, and the rear wiper motor M1 is driven to wipe the rear window glass 4 with the wiper blade (the rear wiper) 7.

In this way, in the reverse position of the shift lever 3, when the washer switch SW1 is kept turned on, the electric pump 20 is connected to the camera wash nozzle N2, so that the washer fluid is fed to the washer nozzle N2 to spray the washer fluid over the glass cover 10a. When the predetermined time period elapses, the electric pump 20 is automatically connected to the rear window wash nozzle N1. Thereby, the washer fluid is fed to the rear window wash nozzle N1 to spray the washer fluid over the rear window glass 4, and also the rear wiper motor M1 is driven. In this way, the washing of the onboard camera 10 (the glass cover 10a) and the washing of the rear window glass 4 can be executed to obtain the good rear view through both of the onboard camera 10 and the rear window glass 4 without requiring the separate switch manipulations by the driver for the washing of the onboard camera 10 (the glass cover 10a) and the washing of the rear window glass 4, respectively. Furthermore, although the rear wiper motor M1 is driven based on the command signal outputted from the washer switch SW1, at the time (within the predetermined time period t) of washing the onboard camera 10, the rear wiper motor M1 is not driven, and thereby the wiping movement of the wiper blade (rear wiper) 7 does not occur. Thus, it is possible to limit occurrence of the wiping movement of the wiper blade (the rear wiper) 7 in the state where the surface of the rear window glass 4 is dried out.

Additional advantages and modifications will readily occur to those skilled in the art. The present disclosure in its broader terms is therefore not limited to the specific details, representative apparatus, and illustrative examples shown and described.

What is claimed is:

1. A washer apparatus for a vehicle, comprising:
    an onboard camera that is placed at a rear side of the vehicle;
    a tank that is adapted to store washer fluid;

a camera wash nozzle that is adapted to receive the washer fluid from the tank and to spray the washer fluid over one side of the onboard camera where a lens of the onboard camera is located;

at least one window wash nozzle that is adapted to receive the washer fluid from the tank and to spray the washer fluid over at least one of a front window glass and a rear window glass of the vehicle, the at least one window wash nozzle including a rear window wash nozzle that is placed at the rear side of the vehicle to spray the washer fluid over the rear window glass;

an electric pump that is adapted to pump the washer fluid from the tank and thereby to supply the washer fluid toward the camera wash nozzle and the at least one window wash nozzle;

a washer switch that outputs a command to drive the electric pump when the washer switch is manipulated by a user of the vehicle;

a main conduit that is adapted to connect between the electric pump and the at least one window wash nozzle to supply the washer fluid to the at least one window wash nozzle, the main conduit forming a flow passage between the electric pump and the rear window wash nozzle;

a branch conduit that is branched from the main conduit and is adapted to connect between an upstream side portion of the main conduit, which is located on an upstream side of the branch conduit, and the camera wash nozzle to supply the washer fluid to the camera wash nozzle;

a switching device that is provided at a location between the upstream side portion of the main conduit and the branch conduit and is adapted to connect the upstream side portion of the main conduit to one of the at least one window wash nozzle and the camera wash nozzle, wherein the switching device is configured to, when the switching device receives an electric signal, which indicates placement of the vehicle in a reverse drive mode, connect the upstream side portion of the main conduit to the camera wash nozzle through the branch conduit upon disconnecting the upstream side portion of the main conduit from the at least one window wash nozzle, a rear wiper motor that drives a rear wiper, which is adapted to wipe the rear window glass; and a controller that is configured to:
control the switching device to maintain the connection of the upstream side portion of the main conduit to the camera wash nozzle through a predetermined time period when the controller receives both of the electric signal, which indicates the placement of the vehicle in the reverse drive mode, and the command outputted from the washer switch;

drive the electric pump to spray the washer fluid through the camera wash nozzle through the predetermined time period; and drive the rear wiper motor to wipe the rear window glass with the rear wiper in a subsequent period, which is immediately after the predetermined time period and in which the controller continuously receives the command from the washer switch even after elapsing of the predetermined time period.

2. The washer apparatus according to claim 1, wherein the electric signal is a signal that indicates positioning of a shift lever of a transmission of the vehicle into a reverse position.

3. The washer apparatus according to claim 2, wherein:
the electric signal, which indicates the positioning of the shift lever into the reverse position, is an electric power that is directed to a back lamp, which is lit upon placement of the shift lever into the reverse position; and the switching device receives a portion of the electric power directed to the back lamp, as the electric signal.

4. The washer apparatus according to claim 1, wherein:
the switching device is connected to a power supply circuit that supplies the electric power to a rear wiper motor, which drives a rear wiper that is adapted to wipe the rear window glass; and a portion of the electric power directed to the rear wiper motor is supplied to the switching device to drive the switching device.

5. The washer apparatus according to claim 1, wherein the controller is configured to:
control the switching device to connect the upstream side portion of the main conduit to the rear window wash nozzle while disconnecting the upstream side portion of the main conduit from the camera wash nozzle in the subsequent period; and drive the electric pump to spray the washer fluid through the rear window wash nozzle in the subsequent period.

6. A washer apparatus for a vehicle, comprising:
an onboard camera that is placed at a rear side of the vehicle;

a tank that is adapted to store washer fluid;

a camera wash nozzle that is adapted to receive the washer fluid from the tank and to spray the washer fluid over one side of the onboard camera where a lens of the onboard camera is located;

a rear window wash nozzle that is adapted to receive the washer fluid from the tank and to spray the washer fluid over a rear window glass of the vehicle;

a rear wiper motor that drives a rear wiper, which is adapted to wipe the rear window glass;

an electric pump that is adapted to pump the washer fluid from the tank and thereby to supply the washer fluid toward the camera wash nozzle and the rear window wash nozzle;

a washer switch configured to output a command to drive the electric pump when the washer switch is manipulated by a user of the vehicle;

a main conduit that is adapted to connect between the electric pump and the rear window wash nozzle to supply the washer fluid to the rear window washer nozzle;

a branch conduit that is branched from the main conduit and is adapted to connect between an upstream side portion of the main conduit, which is located on an upstream side of the branch conduit, and the camera wash nozzle to supply the washer fluid to the camera wash nozzle;

a switching device that is provided at a location between the upstream side portion of the main conduit and the branch conduit and is adapted to connect the upstream side portion of the main conduit to the rear window wash nozzle and the camera wash nozzle, wherein: when the switching device receives an electric signal, which indicates placement of the vehicle in a reverse drive mode, the switching device connects the upstream side portion of the main conduit to the camera wash nozzle through the branch conduit upon disconnecting the upstream side portion of the main conduit from the rear window wash nozzle; and a controller that is configured to:
control the switching device to maintain the connection of the upstream side portion of the main conduit to the camera wash nozzle through a predetermined time period when the controller receives both of the electric signal, which indicates the placement of the vehicle in the reverse drive mode, and the command outputted from the washer switch;

drive the electric pump to spray the washer fluid through the camera wash nozzle; and stop the rear wiper motor to prevent wiping of the rear window glass with the rear wiper during the predetermined time period.

7. The washer apparatus according to claim 6, wherein the electric signal is a signal that indicates positioning of a shift lever of a transmission of the vehicle into a reverse position.

8. The washer apparatus according to claim 7, wherein:

the electric signal, which indicates the positioning of the shift lever into the reverse position, is an electric power signal that is directed to a back lamp, which is lit upon placement of the shift lever into the reverse position; and the switching device receives a portion of the electric power signal directed to the back lamp, as the electric signal.

9. The washer apparatus according to claim 8, wherein:

the switching device is connected to a power supply circuit that supplies the electric power signal to a rear wiper motor, which drives a rear wiper that is adapted to wipe the rear window glass; and a portion of the electric power signal directed to the rear wiper motor is supplied to the switching device to drive the switching device.

10. The washer apparatus according to claim 6, wherein the controller is configured to drive the rear wiper motor to wipe the rear window glass with the rear wiper in a subsequent period, which is immediately after the predetermined time period and in which the controller continuously receives the command from the washer switch even after the predetermined time period has elapsed.

11. The washer apparatus according to claim 10, wherein the controller is configured to:

control the switching device to connect the upstream side portion of the main conduit to the rear window wash nozzle while disconnecting the upstream side portion of the main conduit from the camera wash nozzle in the subsequent period; and drive the electric pump to spray the washer fluid through the rear window wash nozzle in the subsequent period.

12. The washer apparatus according to claim 6, wherein the switching device is an electrically controlled switching device.

13. The washer apparatus according to claim 6, wherein the switching device is a solenoid switch.

14. The washer apparatus according to claim 6, wherein the predetermined time period is shorter than the time during which the command is outputted from the washer switch.

15. The washer apparatus according to claim 1, wherein the switching device is an electrically controlled switching device.

16. The washer apparatus according to claim 1, wherein the switching device is a solenoid switch.

17. The washer apparatus according to claim 1, wherein the predetermined time period is shorter than the time during which the command is outputted from the washer switch.

* * * * *